Nov. 8, 1960 P. J. NATHO 2,959,189
MULTIPLE PORT VALVE
Filed May 27, 1958 2 Sheets-Sheet 1

Paul J. Natho
INVENTOR.

BY Russell E. Dehloff
ATTORNEY

Nov. 8, 1960  P. J. NATHO  2,959,189
MULTIPLE PORT VALVE
Filed May 27, 1958  2 Sheets-Sheet 2
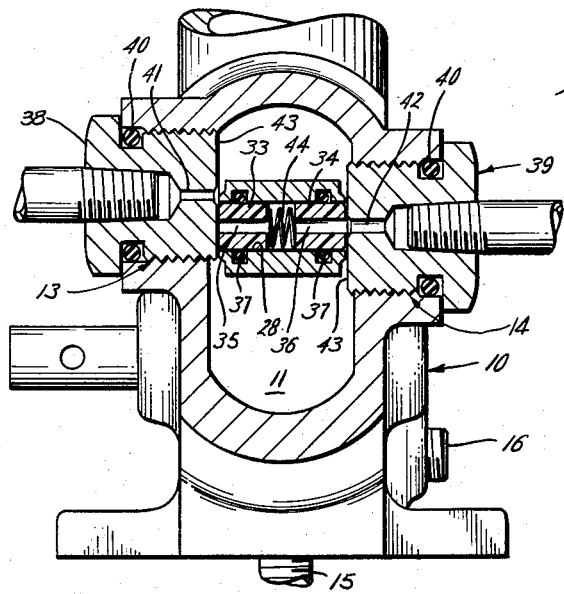
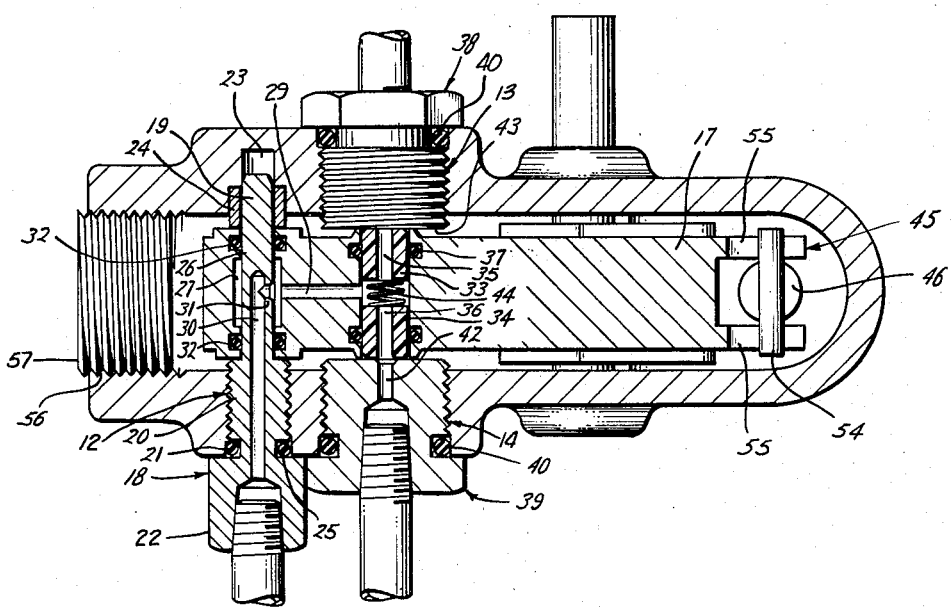
Paul J. Natho
INVENTOR.
BY Russell E. Schloff
ATTORNEY United States Patent Office 2,959,189
Patented Nov. 8, 1960

2,959,189

MULTIPLE PORT VALVE

Paul J. Natho, 3742 Turnberry, Houston, Tex.

Filed May 27, 1958, Ser. No. 738,215

11 Claims. (Cl. 137—622)

This invention relates generally to valves and more particularly to multiple port valves.

One of the common multiple port valves is a "four-way valve" which is one in which pressure can be applied alternately to one of two ports and the unconnected port can be bled to a reservoir or atmosphere. Four-way valves are commonly used in closed hydraulic systems in which there is a hydraulic cylinder to which pressure is applied alternately to each side. In most closed hydraulic systems, leakage is of no consequence and therefore balanced spool type four-way valves requiring a minimum of operating force have been designed and are commercially available. However, in most instances these valves do leak.

In certain installations, such as in the automation of offshore petroleum production, the valve operator may be in one position for a long period of time, generally in an energized position. Consequently, if leakage occurs under these conditions, the motor of the pump supplying the hydraulic fluid to the system will have to be constantly energized to supply the amount of fluid which has leaked. The constant on-and-off operation of the motor is highly undesirable since the entire unit will be located in an inaccessible place and replacement of a motor would be a major operation.

The commercially available balanced spool type four-way valves are manufactured with sufficient clearances to provide easy operation and manufacturing convenience; therefore, the tolerances are often such that the valve leaks. Frequently, the manufacturer will supply the purchaser with a chart or graph showing the amount of leakage of the valve. If in such design close tolerances are held, the valve will be harder to operate and the amount of power required for operation increased and since most of these valves are operated by solenoids, an increase of power necessary to operate the valve makes it difficult to obtain a sufficiently strong solenoid and remain within the limits of current transmission normally available. Power for motor and solenoid in offshore installations must be carried over long distances and it is essential that current requirements be kept to a minimum to limit the physical size of the cable. Commercially available four-way valves of the shear seal type (ones having a minimum of leakage) have been so designed that there are unbalanced forces and therefore, the operating torque for such valves is of great magnitude, again requiring a large amount of power.

To overcome these objections, the valve of the present invention has been so designed that the fluid is conducted through the valve so that all forces will be in a balanced condition thereby requiring a minimum operating force. Also, the seals around the outlet ports are pressure actuated and formed of resilient material which effects a bubble tight seal. A valve made in accordance with the present invention has been operated successfully in a system for 10,000 times without any evidence of leakage. At one time, the closed system was allowed to remain pressurized for a period of 60 days. As nearly as can be ascertained, the valve remained bubble-tight throughout the entire period.

It is the principal object of the present invention to provide a bubble-tight leakproof four-way valve requiring a minimum operating force.

Another object is to provide a multiple port valve in which all the forces in the valve are balanced.

A further object is to provide a four-way valve having pressure acting resilient seals.

It is a further object to provide a four-way valve powered by a solenoid which is provided with a manual override operator.

It is still a further object to provide a multiple port valve having resilient seals in which any wear of the seals will be automatically compensated.

Other and further objects of the invention will be obvious upon understanding of the illustrated embodiment about to be described, or will be indicated in the appended claims, and various advantages not referred to herein will occur to one skilled in the art upon employment of the invention in practice.

A preferred embodiment of the invention has been chosen for the purpose of illustration and description and is shown in the accompanying drawings, forming a part of the specification, wherein:

Fig. 3 is a sectional view taken generally along lines 3—3 of Fig. 1.

Fig. 4 is a sectional view taken generally along lines 4—4 of Fig. 1.

Figure 1:
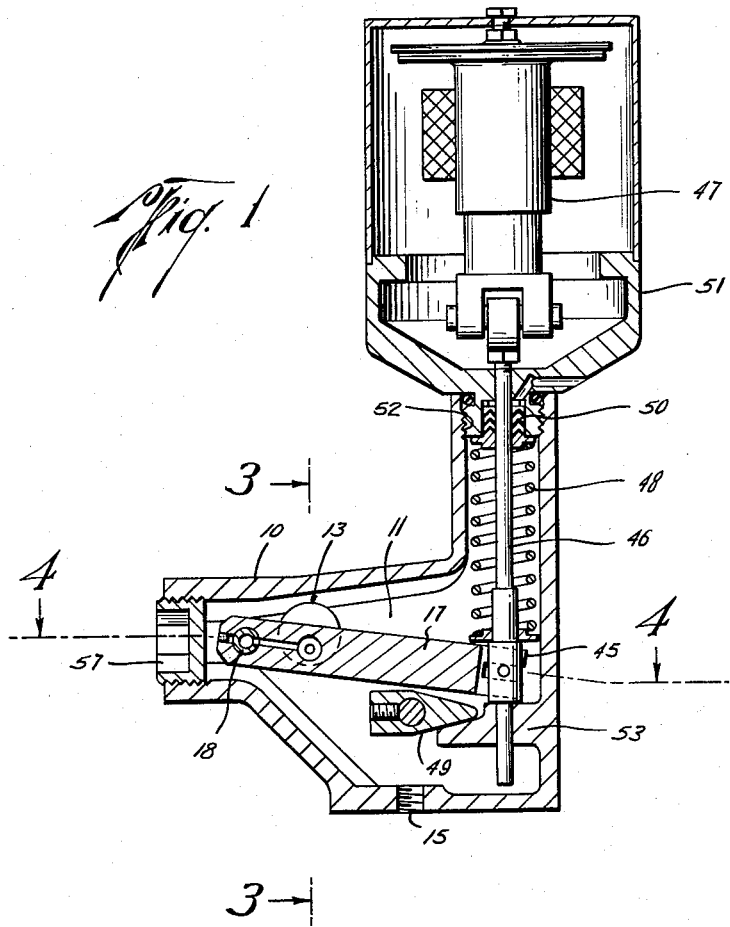
Fig. 1 is a vertical sectional view showing the valve in a de-energized position.

Reference will now be made to the drawings, more particularly to Figs. 1 and 4 wherein there is a housing 10 having a hollow internal chamber 11 wherein the valve mechanism is housed. The housing is provided with an inlet port 12, two outlet ports 13 and 14. The inlet port 12 and outlet port 14 are on one wall and the other outlet port 13 is on the opposite wall. The outlet ports 13 and 14 are aligned in a vertical plane extending transversely through the body but displaced horizontally, see Figs. 3 and 4. Two passages 15 and 16, either of which can be connected to a reservoir or to the atmosphere, are also located in the walls of the housing. The two drains are provided so that there is a choice in mounting the valve.

A pivoted valve carrier element 17 is directly connected to the inlet port 12 and may be selectively connected with either of the outlet ports 13 or 14. The carrier is pivoted on a carrier shaft 18. The carrier shaft 18 is formed of a cylindrical rod 19, a threaded portion 20 having an undercut shoulder 21 and a wrench receiving end portion 22. A hole 23 is formed in the wall of the body opposite the inlet port 12. The end of the cylindrical portion of the carrier shaft is journalled in this hole. If desired, the hole 23 may be counterbored and provided with a bearing 24. While when the shaft 18 is in position, it does not move, the bushing 24 is provided in order to control the side clearance of the carrier. By utilization of the bushing, machining of the interior wall of the body to provide such clearance is eliminated. The threaded end 20 of the shaft 18 is engaged with threads in the inlet port 12 and an O-ring 25 is placed about the recessed pocket 21 and seals the interior of the body 11. The cylindrical portion 19 of carrier shaft 18 passes through a bore 26 in the valve carrier 17. The bore 26 is enlarged in the center portion of the carrier 17 forming a fluid chamber 27. In addition to the bore 26, the carrier is provided with a second transverse bore 28 which can be selectively moved adjacent to either of the outlet ports as will be subsequently described and a longitudinal bore 29 connecting the fluid chamber 27 and transverse bore 28. The carrier shaft 18 is provided with an axial passage 30 which terminates approximately in the center of the carrier 17 where a passage 31 connects the passage 30 with fluid chamber 27. It is through the passages 30 and 31 that the fluid flows through the inlet port into the fluid chamber 27 in the valve carrier 17. O-ring seals 32—32, one at each end of the enlarged portion of the bore 26, are used to contain the fluid in the fluid chamber 27 and thereby retaining it from flowing into the internal chamber 11. Positioned in the transverse outlet bore 28 are cylindrical resilient seal members 33 and 34. The seals are provided with centrally located passages 35 and 36 respectively. Each seal member is packed off by an O-ring 37 to seal fluid from flowing around the seal members thereby sealing the bore 28.

The outlet ports 13 and 14 are provided with threaded plugs 38 and 39 which are threaded into the respective outlet passages 13 and 14. An O-ring 40 around each plug 38 and 39 seals the interior 11 of the body. Each plug is provided with a fluid passage, 41 and 42 respectively. The inner end 43 of each plug 38 and 39 is a highly polished surface and the resilient seal members 33 and 34 contact this surface to effect a seal.

The carrier 17 is adapted to align one of the passages 35—36 of the resilient seal members 33 and 34 with one of the passages 41 or 42 of the outlet ports. At the same time, the other resilient seal member will be against the solid portion of the other plug, see Fig. 3. Therefore, when the valve is in the position shown in Figs. 1 and 3, fluid will flow through the inlet passage 12, then flow through the passages 30 and 31 into fluid chamber 27, through the passage 29 and then out through the passage 36 through the passage 42 in outlet 14. Fluid which is in the system will flow back through passage 41 of outlet port 13 into the interior 11 of the housing and out either the passage 15 or 16 depending on the mounting of the valve. As can be seen in Fig. 3, the carrier 17 does not cover the outlet port passage to which it is not connected. However, the passage in the resilient seal member and the resilient seal member itself is against the polished surface 43 so as to effect a seal.

Fluid in the passages 30—31 enters into the fluid chamber 27. At such time, it will exert equal force toward both sides of the housing and as a result, the resultant force will be zero. Likewise, after the fluid passes through the passage 29 and is in the bore 28, the pressure will exert an equal force against both sides of the housing with again the resultant force of zero since the pressure will act upon the correspondingly equal diameters of the resilient seal members 33 and 34.

If desired, the valve can be used as a three-way valve by having one of the plugs solid in which case the valve will be still of balanced construction. In one position fluid can flow through the valve and out the outlet, in the other position it will return through the outlet port and into the body chamber from where it flows through the drain.

In order that the seals 33 and 34 are pressure acting, it is desirable to make a slight bevel on the outside corner of the resilient seal members 33 and 34; therefore, the area of the face of the seal member opposing the housing will be less than the area which the pressure acts against and it will always tend to move the seals 33 and 34 against the highly polished inner surface 43 of the plugs 38 and 39 in the outlet ports and at such time effect a positive seal, either around the passage in the plug or against the polished surface of the plug. Since the resilient seal members 33 and 34 are free to move in the bore 28, any wear of the seals will be automatically compensated.

In order to separate the resilient seal members 33 and 34, in initial installation, a spring 44 may be interposed between the two seal members.

Figure 2:
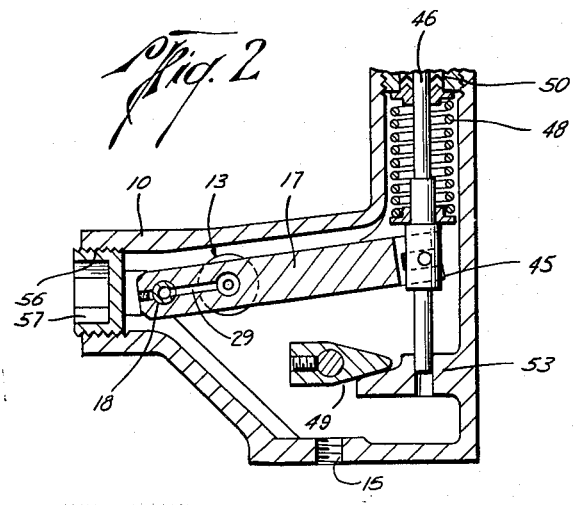
Fig. 2 is a fragmentary view similar to Fig. 1 showing the valve in an energized position.

In order that the carrier 17 can be moved from the position it is shown in Figs. 1 and 3, the end 45 of the carrier 17 is connected to a vertical rod 46 by a pin and slot connection. The rod 46 is connected to a solenoid 47. While a solenoid is shown in the drawings and herein described as a means of operating the valve, other means such as diaphragms, hydraulic pistons, etc. may be used if so desired. By energizing the solenoid 47, the rod 46 is pulled upward and the carrier 17 moves to the position shown in Fig. 2 at which time the passage 35 of the seal member 33 in the carrier will be aligned with the passage 41 in the outlet port 13. At the same time, passage 36 will not be aligned with its outlet passage 42 and instead will be against the solid portion 43 of the plug in the outlet port and it will effect a seal. However, port 42 will not be blocked and any fluid in the system can flow through into the internal hollow valve chamber and out the drain 15 or 16. A spring 48 is interposed between the solenoid 47 and the end 45 of the carrier. Therefore, when the solenoid 47 is de-energized the carrier 17 will immediately be returned to the position shown in Fig. 1. In order to provide emergency and mechanical operation, a pivoted cam 49 is provided. The cam 49 contacts the carrier 17 and the cam operates as a mechanical override when the solenoid is de-energized.

In order to take advantage of a decreased size solenoid, the carrier 17 is made fairly long. For example, a magnet having a nine pound pull with a 1" travel is smaller than a magnet having an eighteen pound pull for ½" travel; therefore, by extending the length of the carrier 17, it was possible to take advantage of a mechanical leverage in decreasing the force necessary to move the carrier the ¼" between the passages in two outlet ports 13 and 14. By connecting the solenoid 47 directly to the end 45 of the carrier 17, it is not necessary to go through any secondary connection and therefore friction is kept to a minimum.

To assemble the valve, the stem 46 together with the spring 48, packing 50 and solenoid support 51 is inserted into the opening 52. The stem 46 extends through the shaft guide 53 and is oriented so that the carrier drive pin 54 will be in position to receive the slots 55—55 in the end of the carrier 17. With O-rings 32 and 37 in place, carrier 17 is slid through the end opening 56 with the slots 55—55 in the end of the carrier 17 engaging the aforementioned pin 54 on the stem 46. The carrier shaft 18 is then inserted through the inlet port 12 and the bore 26 in the carrier 17 and into the bushing 24 thus providing the pivot point for the carrier 17. The resilient seals 33 and 34 may be inserted into the carrier through the ports 13 and 14. After the seals have been installed, the plugs 38 and 39 may be threaded into place. Before inserting the seals 33 and 34 into the carrier, place the spring 44 between the seals 33 and 34 in order to form the initial seal and prevent the seals 33 and 34 from covering the port 29. The valve now being assembled, the opening 56 is closed by the plug 57.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A four-way valve comprising a housing having a hollow internal valve chamber, the walls of the housing being provided with an inlet port, two outlet ports and a drain, the inlet port and one outlet port being on one wall and the other outlet port being on the opposite wall, the outlet ports being aligned in a vertical plane but displaced horizontally, the outlet ports having highly polished surfaces facing the chamber, a shaft extending inwardly from the inlet port and journalled in the opposite wall of the housing, a valve carrier element in the valve chamber pivotally mounted on said shaft, a transverse fluid chamber centered in the pivoted end of said carrier, a passage in said shaft extending from the inlet port opening into said transverse fluid chamber, a second transverse fluid chamber extending through the carrier at a point adjacent the outlet ports, a longitudinal passage connecting the first and second transverse chambers, cylindrical resilient valve members mounted in said second transverse chamber, means separating said resilient members, means to selectively move the carrier, one of said valve members in one position aligning with an outlet port and the other contacting the area adjacent the opposite outlet port and sealing against such surface, the other outlet port being in communication with the body.

2. A four-way valve comprising a housing having a hollow internal valve chamber, the walls of the housing being provided with an inlet port, two outlet ports and a drain, the inlet port and one outlet port being on one wall and the other outlet port being on the opposite wall, the outlet ports being aligned in a vertical plane but displaced horizontally, the outlet ports being provided with highly polished surfaces facing the chamber, a shaft extending inwardly from the inlet port and journalled in the opposite wall of the housing, a valve carrier element in the valve chamber pivotally mounted on said shaft, a transverse fluid chamber centered in the pivoted end of said carrier, a passage in the shaft extending from the inlet port opening into said transverse fluid chamber, a second transverse fluid chamber extending through the carrier, a longitudinal passage connecting the first and second transverse chambers, resilient valve members mounted in said second transverse chamber, one of said valve members aligning with an outlet port and the other contacting the area adjacent the opposite outlet port and sealing against such surface, the other outlet port being in communication with the body, and means to selectively move the carrier.

3. The structure specified in claim 2 characterized in that the means to move the carrier is a solenoid connected to the free end of the carrier.

4. The structure specified in claim 3 characterized in that there is manual means to move the carrier when the solenoid is de-energized.

5. A valve comprising a housing having a hollow internal valve chamber, the walls of the housing being provided with an inlet port and two outlet ports, the inlet port and one outlet port being on one wall and the other outlet port being on the opposite wall, the outlet ports being aligned in a vertical plane but displaced horizontally, the outlet ports having sealing surfaces facing the chamber, a shaft extending inwardly from the inlet port and journalled in the opposite wall of the housing, a valve carrier element in the valve chamber pivotally mounted on said shaft, a transverse fluid chamber in the pivoted end of said carrier, a passage in the shaft extending from the inlet port opening into said transverse fluid chamber, a second transverse fluid chamber extending through the carrier at a point adjacent the outlet ports, a passage connecting the first and second transverse chambers, valve members mounted in said second transverse chamber, one of said valve members in one position aligning with an outlet port and the other contacting the area adjacent the opposite outlet port and sealing against such surface, means to move the carrier to a position where the other valve member is aligned with the other outlet port.

6. A valve comprising a housing having a hollow internal valve chamber, the walls of the housing being provided with an inlet port and two outlet ports, the outlet ports being on opposite walls of the housing, each outlet port being provided with a sealing surface facing the chamber, a shaft extending inwardly from the inlet port and journalled in the opposite wall of the housing, a valve carrier element in the valve chamber pivotally mounted on said shaft, a fluid chamber in the pivoted end of said carrier, a passage in shaft extending from the inlet port opening into said fluid chamber, a second fluid chamber extending through the carrier at a point adjacent the outlet ports, a passage connecting the first and second chambers, seal members mounted in said second chamber, one of said seal members in one position aligning with an outlet port and the other contacting the area adjacent the opposite outlet port and sealing against such surface, means to move said carrier.

7. A four-way valve comprising a housing having a hollow internal valve chamber, the walls of the housing being provided with an inlet port, two outlet ports and a drain, the outlet ports being on opposing walls of the housing, each outlet port being provided with a sealing surface facing the chamber, a shaft extending inwardly from the inlet port and journalled in the opposite wall of the housing, a valve carrier element in the valve chamber pivotally mounted on said shaft, a fluid chamber in the pivoted end of said carrier, a passage in shaft extending from the inlet port opening into said fluid chamber, a second fluid chamber extending through the carrier at a point adjacent the outlet ports, a passage connecting the first and second chambers, seal members mounted in said second chamber, one of said seal members in one position aligning with an outlet port and the other contacting the area adjacent the second outlet port and sealing against such surface, the second outlet port being in communication with the body, and means to move said carrier.

8. A valve having a housing with an internal valve chamber, outlet ports on opposing walls of said housing, the inner surface of the outlet ports adjacent the passage in the outlet port being finished to provide a sealing surface, a pivoted valve member in the chamber, means to supply fluid to said valve member, a transverse bore in said valve member which will selectively align with one or the other of the outlet port passages, pressure actuated resilient seal members in said bore, the seal members having a central passage to provide flow when aligned with the passage of one of the outlet ports, the effective area of the face of the sealing member opposing the outlet port being less than the effective area of the inner face whereby the seal member will be forced against the outlet ports, one to seal around the passage in the outlet port and the other to seal against the sealing surface of the outlet port.

9. A valve comprising a housing having a hollow internal valve chamber, the walls of the housing being provided with an inlet port and two outlet ports, the inlet port and one outlet port being on one wall and the other outlet port being on the opposite wall, the outlet ports being aligned in a vertical plane but displaced horizontally, the outlet ports having sealing surfaces facing the chamber, a shaft extending inwardly from the inlet port and journalled in the opposite wall of the housing, a valve carrier element in the valve chamber pivotally mounted on said shaft, a transverse fluid chamber in the pivoted end of said carrier, a passage in the shaft extending from the inlet port opening into said transverse fluid chamber, seal means about said fluid chamber restraining fluid from flowing into the internal chamber, a second transverse fluid chamber extending through the carrier at a point adjacent the outlet ports, a passage connecting the first and second transverse chambers, valve members mounted in said second transverse chamber, seal means about said valve means to seal the bore, one of said valve members in one position aligning with an outlet port and the other contacting the area adjacent the opposite outlet port and sealing against such surface, means to move the carrier to a position where the other valve member is aligned with the other outlet port.

10. A valve comprising a housing having a hollow internal valve chamber, the walls of the housing being provided with an inlet port and two outlet ports, the inlet port and one outlet port being on one wall and the other outlet port being on the opposite wall, seal means about said inlet and outlet ports to seal said internal chamber, the outlet ports being aligned in a vertical plane but displaced horizontally, the outlet ports having sealing surfaces facing the chamber, a shaft extending inwardly from the inlet port and journalled in the opposite wall of the housing, a valve carrier element in the valve chamber pivotally mounted on said shaft, a transverse fluid chamber in the pivoted end of said carrier, a passage in the shaft extending from the inlet port opening into said transverse fluid chamber, means to seal said chamber so that fluid coming into said chambere will not flow into the body, a second transverse fluid chamber extending through the carrier at a point adjacent the outlet ports, a passage connecting the first and second transverse chambers, valve members mounted in said second transverse chamber, seal means about said valve members to seal around said second fluid chamber, one of said valve members in one position aligning with an outlet port and the other contacting the area adjacent the opposite outlet port and sealing against such surface, means to move the carrier to a position where the other valve member is aligned with the other outlet port.

11. A valve comprising a housing having a hollow internal valve chamber, the walls of the housing being provided with an inlet port, an outlet port, a drain, and a sealing area opposite the outlet port, a shaft extending inwardly from the inlet port and journalled in the opposite wall of the housing, a valve carrier element in the valve chamber pivotally mounted on said shaft, a transverse fluid chamber in the pivoted end of said carrier, a passage in the shaft extending from the inlet port opening into said transverse fluid chamber, a second transverse fluid chamber extending through the carrier at a point adjacent the outlet port, a passage connecting the first and second transverse chambers, seal members mounted in said second transverse chamber, one of said seal members in one position aligning with the outlet port and the other contacting the sealing area opposite the outlet port, means to move the carrier to a position where fluid can not flow through the valve but where fluid can flow through the outlet port into the hollow internal valve chamber and out the drain.

References Cited in the file of this patent

UNITED STATES PATENTS

| | | |
|---|---|---|
| 2,165,096 | Frechette | July 4, 1939 |
| 2,603,192 | Kensok | July 15, 1952 |
| 2,742,919 | Ray | Apr. 24, 1956 |
| 2,858,849 | Griffith | Nov. 4, 1958 |

FOREIGN PATENTS

| | | |
|---|---|---|
| 131,354 | Great Britain | Aug. 28, 1919 |